United States Patent Office 3,166,569
Patented Jan. 19, 1965

---

3,166,569
5,5'-DIAMINO-1,1'-DIANTHRIMIDE CARBAZOLE-SULFONIC ACIDS AND A PROCESS FOR THEIR PREPARATION
Max Jost, Basel, Switzerland, assignor to Ciba Limited, Basel, Switzerland, a company of Switzerland
No Drawing. Filed Nov. 6, 1962, Ser. No. 235,861
Claims priority, application Switzerland, Nov. 10, 1961, 13,091/61
2 Claims. (Cl. 260—316)

A number of vattable amines are known that contain sulfonic acid groups. However, they found no practical application because they produce unfast dyeings.

It has now been found that, surprisingly, the 5,5'-diamino-1,1'-dianthrimide carbazole sulfonic acids whose sulfonic acid groups can be split off in the presence of reducing agents, are valuable vat dyestuffs.

The dyestuffs of this invention can be obtained by sulfonating the corresponding diamine.

The sulfonation according to this invention can be performed with chlorosulfonic acid in the presence of a tertiary amine.

In spite of their sulfonic acid groups, the new compounds are valuable vat dyestuffs which by the vat dyeing method yield fast dyeings on cellulosic textile materials, especially on cotton. In fact, as compared to the corresponding usual vat dyestuffs having no sulfonic acid groups, they present the advantages that they are easier to vat, that, being water-soluble, they need not be converted into any special, easily vattable, physical form, and that they give more level dyeings whose fastness to light and washing is quite satisfactory.

The resulting dyeings are, as a rule, also fast to dry cleaning and to migration. The dyed fabrics can therefore be coated with artificial resins, such as polyvinyl chloride, without the dyestuff migrating into the coating material. This is of particular importance in the manufacture of artificial leather.

The following example illustrates the invention, the parts being by weight.

Example 45.7 parts of 5,5'-diamino-1,1'-dianthrimide-carbazole are introduced into a mixture, heated to 115° C., of 233 parts of pyridine and 262 parts of chlorosulfonic acid, and stirred for 20 hours at 150–155° C. While still hot, the reaction mass is then diluted with water and treated with 305 parts of sodium carbonate. The pyridine is expelled with steam, and the disodium salt of 5,5'-diamino-1,1'-dianthrimide carbazole-disulfonic acid precipitated nearly quantitatively by adding sodium chloride to its solution. The product is then isolated by filtration, washed with sodium chloride solution of 5% strength, and dried at 70 to 80° C. under vacuum.

The resulting water-soluble dyestuff which, in the form of the free acid, corresponds to the formula

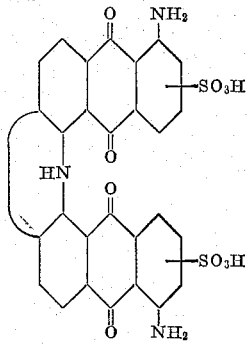

dyes cotton and regenerated cellulose from an alkaline hydrosulfite vat red brown shades are fast to washing, chlorine, and light.

What is claimed is:
1. 5,5' - diamino - 1,1' - dianthrimide carbazole-sulfonic acids of the formula

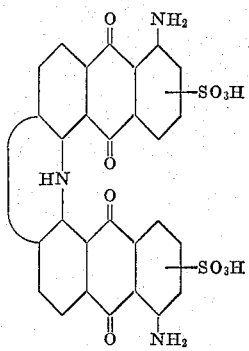

and whose sulfonic acid groups are split off in the alkaline hydrosulfite vat.

2. Process for the manufacture of vat dyestuffs, wherein 5,5'-diamino-1,1'-dianthrimide carbazole is sulfonated with chlorosulfonic acid and a tertiary base.

References Cited in the file of this patent
UNITED STATES PATENTS

| | | |
|---|---|---|
| 2,318,174 | Lulek et al. | May 4, 1943 |
| 2,658,899 | Ogilvie | Nov. 10, 1953 |
| 2,705,717 | Oppliger | Apr. 5, 1955 |

FOREIGN PATENTS

| | | |
|---|---|---|
| 307,838 | Great Britain | June 12, 1930 |
| 347,100 | Great Britain | Apr. 16, 1931 |

OTHER REFERENCES
Whitmore: "Organic Chemistry," 2nd edition, pages 498, 500, Van Nostrand (1951).